US009749147B2

(12) United States Patent
Joy

(10) Patent No.: US 9,749,147 B2
(45) Date of Patent: Aug. 29, 2017

(54) ETHERNET AVB FOR TIME-SENSITIVE NETWORKS

(71) Applicant: Harman International Industries, Incorporated, Stamford, CT (US)

(72) Inventor: Lejin K. Joy, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 151 days.

(21) Appl. No.: 14/584,910

(22) Filed: Dec. 29, 2014

(65) Prior Publication Data

US 2016/0191572 A1 Jun. 30, 2016

(51) Int. Cl.
*H04L 12/413* (2006.01)
*H04L 29/12* (2006.01)
*H04L 29/06* (2006.01)
*H04L 29/08* (2006.01)

(52) U.S. Cl.
CPC .......... *H04L 12/413* (2013.01); *H04L 65/103* (2013.01); *H04L 67/12* (2013.01)

(58) Field of Classification Search
CPC ...... H04L 65/102; H04L 12/413; H04L 13/28
See application file for complete search history.

(56) References Cited

U.S. PATENT DOCUMENTS

| 8,953,436 | B2* | 2/2015 | Diab | H04L 67/327 |
| | | | | 370/217 |
| 8,984,093 | B2* | 3/2015 | Kniplitsch | H04L 67/322 |
| | | | | 709/217 |
| 9,331,854 | B2* | 5/2016 | Oguma et al. | 709/217 |
| 2011/0002316 | A1* | 1/2011 | Chen | 370/338 |

OTHER PUBLICATIONS

IEEE Standards Association, "Timing and Synchronization for Time-Sensitive Applications in Bridged Local Area Networks," IEEE, Mar. 30, 2011, 292 pages.
IEEE Standards Association, "Audio Video Bridging (AVB) Systems," IEEE, Sep. 30, 2011, 45 pages.
IEEE Standards Association, "Media Access Control (MAC) Bridges and Virtual Bridge Local Area Networks," IEEE, Aug. 31, 2011, 1,365 pages (submitted in two parts).
IEEE Standards Association, "IEEE Standard for Layer 2 Transport Protocol for Time-Sensitive Applications in Bridged Local Area Networks," IEEE, May 6, 2011, 57 pages.

\* cited by examiner

*Primary Examiner* — Ayaz Sheikh
*Assistant Examiner* — Debebe Asefa
(74) *Attorney, Agent, or Firm* — McCoy Russell LLP

(57) ABSTRACT

Embodiments are disclosed for a device for handling communications from AVB and non-AVB networks. In some embodiments, a device includes a gateway interface communicatively connectable to one or more devices and configured to transmit and receive data from an AVB network and at least one other, non-AVB network, a processor, and a storage device that stores instructions executable by the processor to receive first data from a first device in the at least one other network, and receive second data from a second device in the AVB network. The instructions are further executable to process one or more of the first data and the second data according to one or more of an AVB protocol and a protocol associated with the at least one other network, and transmit one or more commands to one or more of the first device and the second device.

19 Claims, 7 Drawing Sheets

US 9,749,147 B2

ETHERNET AVB FOR TIME-SENSITIVE NETWORKS

FIELD

The disclosure relates to interfacing time-sensitive networks with an AVB-based controller.

BACKGROUND

Audio Video Bridging (AVB) is a networking protocol pertaining to streaming audio and/or video data via a network (e.g., an Ethernet network), described in IEEE 802.1 standards (e.g., IEEE802.1BA-2011, IEEE 802.1Q-2011, IEEE 802.1AS-2011, etc.). An AVB network may include one or more talkers (e.g., transmitters) and one or more listeners (e.g., receivers) for transmitting and receiving audio/video data according to the Audio/video transport protocol (AVTP), described in the IEEE 1722-2011 standard.

SUMMARY

In a mixed-use environment, such as a vehicle, components may be connected to different networks, including AVB networks and non-AVB networks. Each network may operate according to different protocols and may provide different functionality (e.g., security, data processing, time synchronization, etc.). Such systems may include discrete controllers for each type of network, each controller having one or more dedicated ports for communicating data via that network.

The disclosure provides methods and systems for communicating via an AVB network and a non-AVB network with a single controller. By providing a controller that is capable of processing data according to protocols that govern operation of both AVB and non-AVB networks, a separate controller for the non-AVB networks may be removed, and the functionality of the AVB controller may be increased.

In some embodiments, an example device for handling communications from AVB and non-AVB networks includes a gateway interface communicatively connectable to one or more devices and configured to transmit and receive data from an AVB network and at least one other, non-AVB network, a processor, and a storage device that stores instructions executable by the processor to receive first data from a first device in the at least one other network, and receive second data from a second device in the AVB network. The instructions are further executable to process one or more of the first data and the second data according to one or more of an AVB protocol and a protocol associated with the at least one other network, and transmit one or more commands to one or more of the first device and the second device.

In some embodiments, a communication system includes an AVB device included in an Ethernet AVB network, a Controller Area Network (CAN) device included in a CAN network, and an Ethernet AVB-CAN interface host controller included in the Ethernet AVB network and communicatively connected to the AVB device and the CAN device. The controller includes a CAN-AVB gateway interface configured to communicate data via a CAN bus, and a combined processor stack configured to execute instructions stored on a storage device of the controller to process received data according to one or more of an AVB protocol and a CAN protocol, and transmit a command to one or more of the AVB device and the CAN device based on the received data.

According to some embodiments, an example method for or interfacing an AVB network and a non-AVB network with a host controller includes receiving first data from a first device in the non-AVB network, and receiving second data from a second device in the AVB network. The example method further includes processing one or more of the first data and the second data according to one or more of an AVB protocol and a protocol associated with the non-AVB network, and transmitting one or more commands to one or more of the first device and the second device.

BRIEF DESCRIPTION OF THE DRAWINGS

The disclosure may be better understood from reading the following description of non-limiting embodiments, with reference to the attached drawings, wherein below.

DETAILED DESCRIPTION

As described above, devices in an AVB network may operate according to one or more AVB protocols/standards to provide AVB-related functionality, such as time synchronization, traffic shaping, and/or other suitable operations. The AVB network may be located in a system that includes other time-sensitive networks, such as a CAN network in a vehicle. In such examples, two or more controllers and associated ports may be included in the system to handle communication from each of the networks. However, each controller adds to the complexity (e.g., both hardware- and software-wise), size, and cost of the system. The disclosure provides an interface host controller that capitalizes on the shared communication medium (e.g., twisted pair cabling) of AVB networks and other time-sensitive networks (e.g., CAN networks) to transmit and receive data to/from different types of networks. By eliminating a separate time-sensitive network controller (e.g., a CAN controller) and using only a single controller for communicating across multiple networks, the complexity, size, and cost of the system may be reduced. Further, the combined controller may add functionality to typical AVB controllers by incorporating the protocols that govern operation of the other time sensitive network (e.g., CAN protocols).

Figure 1:
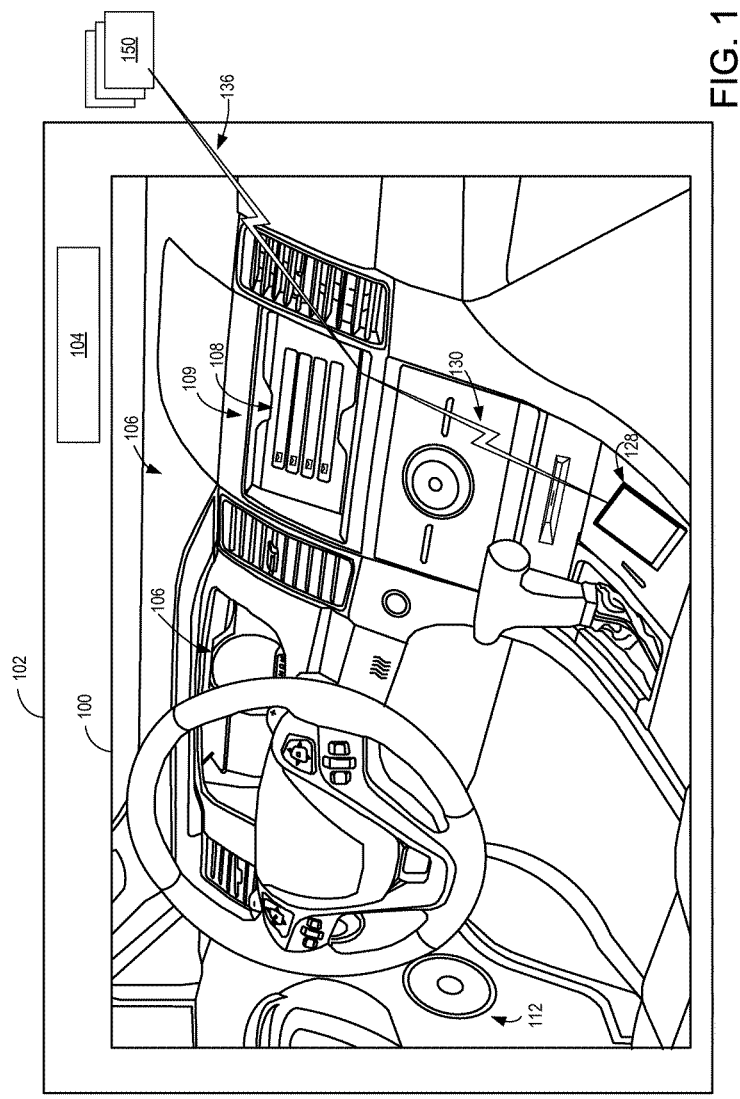
FIG. 1 shows an example partial view of a vehicle cabin in accordance with one or more embodiments of the present disclosure.

FIG. 1 shows an example partial view of one type of environment for a communication system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

In the example environment illustrated in FIG. 1, the in-vehicle computing system 109 may be connected to one or more vehicle systems, such as speakers 112, display 108, vehicle sensors, and/or other suitable vehicle systems via any suitable network. In some examples, the in-vehicle computing system 109 includes a talker device configured to transmit audio/video data to listener devices, such as speakers 112 and display 108 via a network. The network may be configured in accordance with Layer 2 of the Open Systems Interconnection (OSI) model, in which routing and forwarding decisions or determinations in the network may be performed on a media access control (MAC) addressing basis. An example Layer 2 network may be an Ethernet Audio/Video Bridging (AVB) network. For Layer 2 networks configured as AVB networks, the talkers and the listeners may be configured to communicate over the AVB network using various AVB standards and protocols, including the Institute of Electrical and Electronics Engineers (IEEE) 802.1AS-2011 (gPTP) for network timing and synchronization, IEEE 802.1Q-2011 clause 34 for queuing and forwarding streaming data, IEEE 802.1Q-2011 clause 35 (Stream Reservation Protocol (SRP)) for reserving a network connection or path and/or resources such as bandwidth for communication over the network connection, and/or IEEE 1722-2011 related to a possible data streaming format. Other AVB-related standards and protocols, and/or other versions of the AVB standards and protocols, previously, currently, or later developed, may also or alternatively be used.

The in-vehicle computing system may stream audio/video data based on information stored in local storage and/or audio/video data received from mobile device 128 and/or external device(s) 150. Transmitting audio/video data having a proper number of sample chunks within each packet may ensure that the audio/video data is presenting via the speakers 112 and/or display 108 at a proper media rate (e.g., without audio distortions that may arise from samples being skipped or played too early/late).

It is to be understood that FIG. 1 depicts one example environment, however the communication systems and methods described herein may be utilized in any suitable environment. As another example, speakers in a professional audio environment (e.g., an arena, stadium, concert hall, amphitheater, recording studio, etc.) may be utilized as listeners that receive audio data from a talker device (e.g., a mixing console, audio/video receiver, etc.) over an AVB network. Any suitable devices that transmit and/or receive packets may be utilized as the systems and/or to perform the methods described herein.

Figure 2:
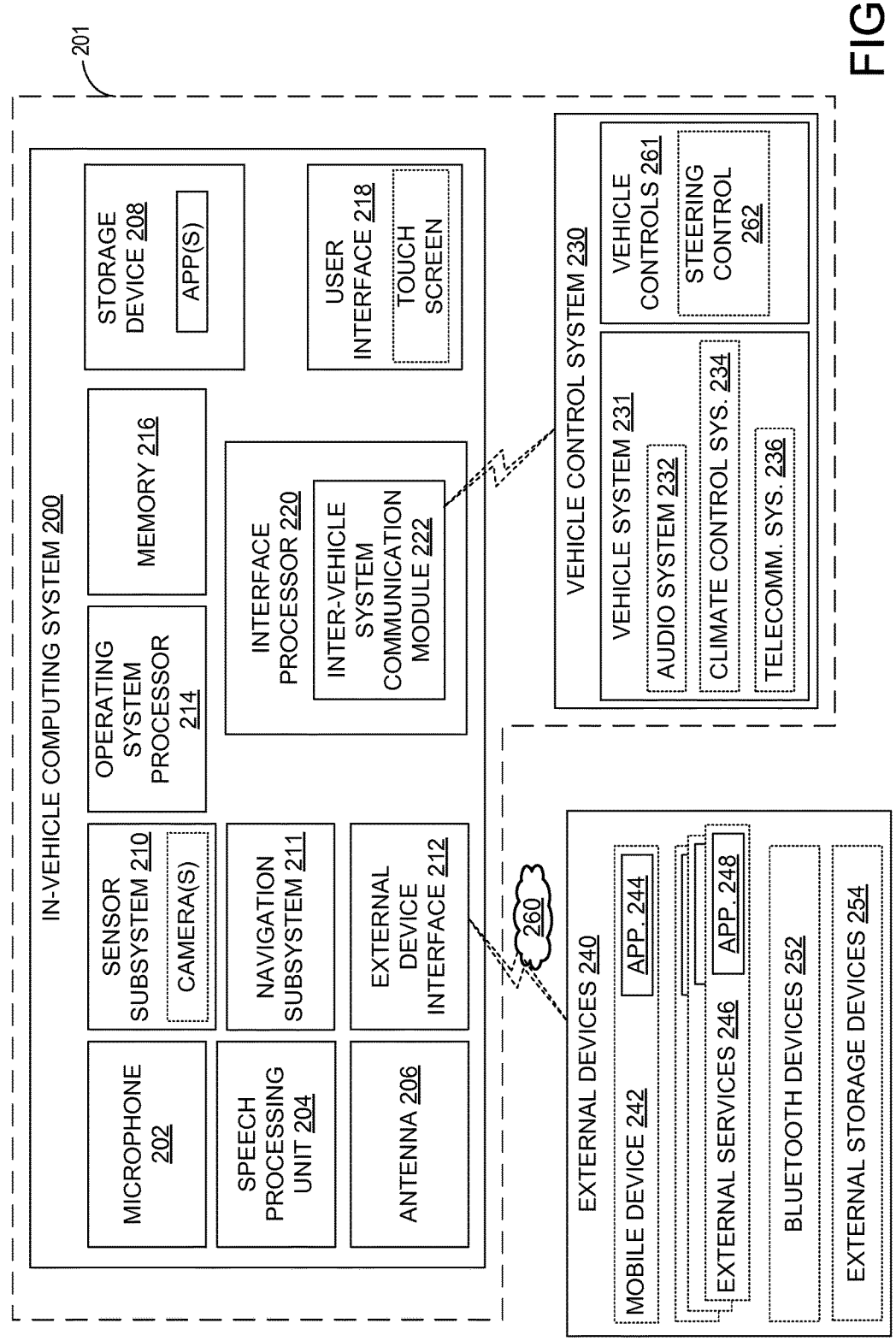
FIG. 2 shows an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 301 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link. The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Figure 3:
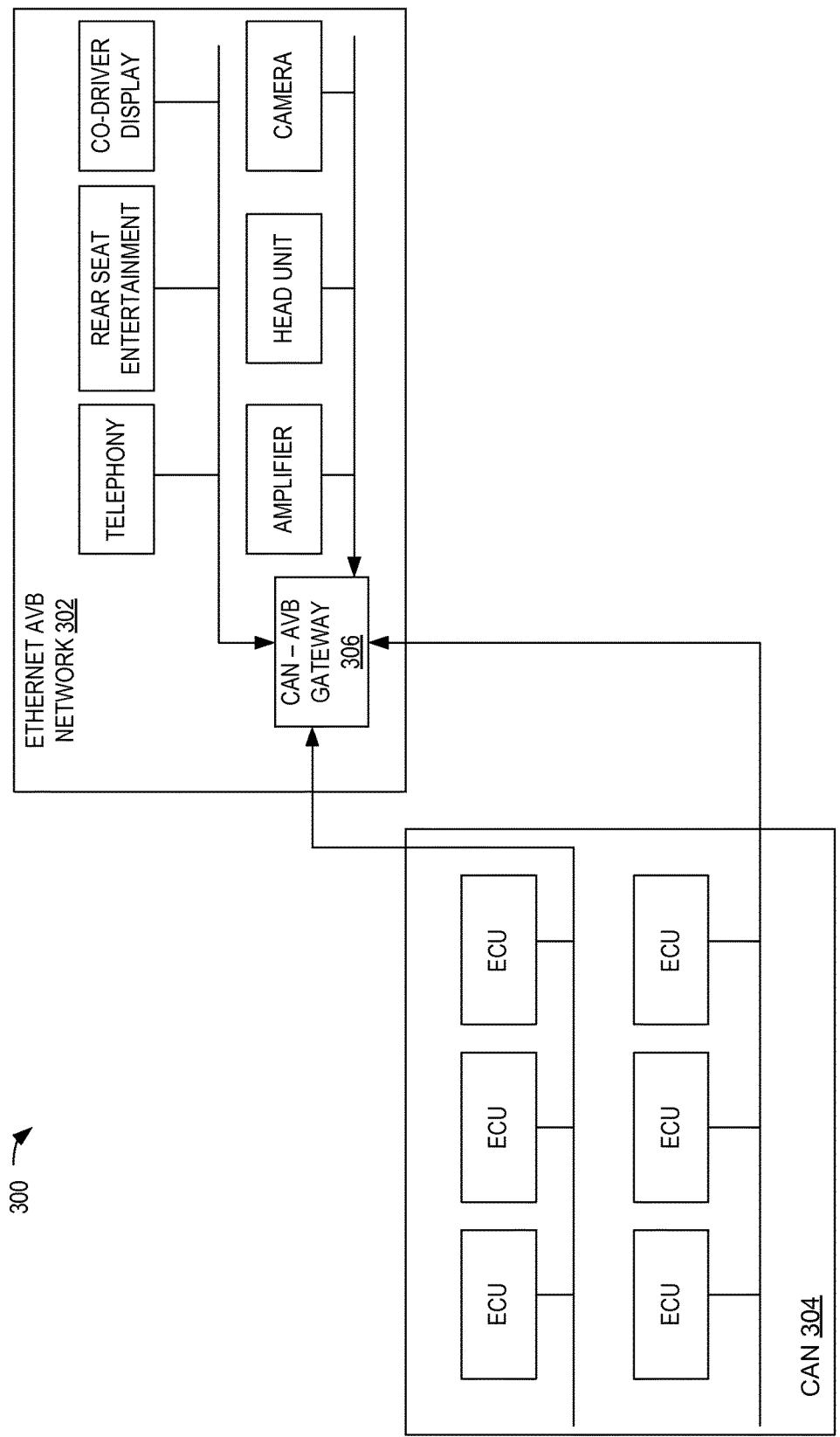
FIG. 3 shows an example communication system including an AVB network and a CAN network in accordance with one or more embodiments of the present disclosure.

FIG. 3 is an example communication system 300 including an Ethernet AVB network 302 and a Controller-Area Network (CAN) 304. It is to be understood that although the examples described above relate to interfacing an Ethernet AVB network with a CAN, the elements described may additionally or alternatively applied to interfacing an Ethernet AVB network with another non-AVB, time-sensitive network. For example, the examples described throughout the disclosure may relate to interfacing an Ethernet AVB network with non-AVB, time-sensitive networks in the fields of high speed motion control, industrial 10 control, process automation, energy automation, automotive communication between electronic control units (ECUs), robotics, and high-speed manufacturing.

Ethernet AVB network 302 may include an infotainment system and associated devices in the illustrated example. Such an Ethernet AVB network may include example nodes such as a telephony system, a rear seat entertainment system, a co-driver display device, an amplifier for speakers of the vehicle, a head unit (e.g., an in-vehicle computing system and/or a controller for an in-vehicle computing system), a camera, and/or any other suitable AVB nodes. Each node in the Ethernet AVB network may be communicatively connected (e.g., via one or more data busses) to a CAN-AVB Gateway 306. CAN 304 may include a plurality of electronic controller units (e.g., ECUs coupled to vehicle systems such as airbag systems, braking systems, electronic throttle control, and/or other life critical systems) that are also connected to CAN-AVB Gateway 306 (e.g., via one or more data busses, which may include different data busses than those connecting the nodes in the Ethernet AVB network). Examples of Ethernet AVB network nodes and CAN devices (e.g., vehicle systems) are described above with respect to FIG. 2.

CAN-AVB Gateway 306 may enable CAN messages that are sent over the CAN physical network 304 to be converted into AVB signals for processing in the Ethernet AVB network 302. The arrangement illustrated in FIG. 3 may allow existing systems to be modified to remove a CAN controller but otherwise maintain the CAN physical network. In other examples, a single Ethernet AVB network may be utilized (e.g., without a CAN network, whereby the vehicle systems are nodes in the Ethernet AVB network) that provides the time-sensitive functionality of a CAN controller while utilizing other features of Ethernet AVB (e.g., PTP synchronization).

Figure 4:
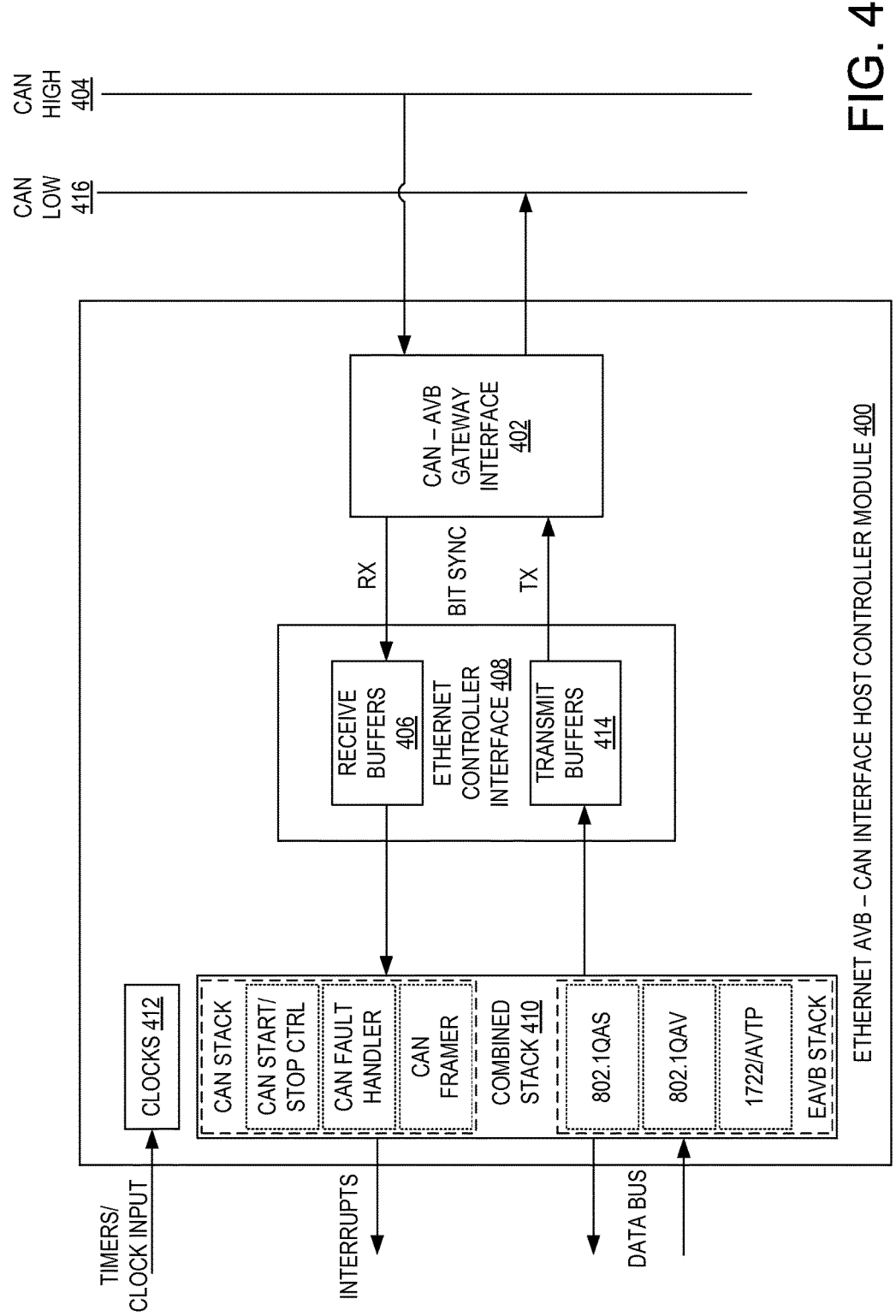
FIG. 4 shows an example Ethernet AVB-CAN interface host controller module in accordance with one or more embodiments of the present disclosure.

FIG. 4 is an example Ethernet AVB-CAN interface host controller module 400 included in an Ethernet AVB network (e.g., Ethernet AVB network 302 of FIG. 3). As illustrated, data from a CAN network (e.g., CAN network 304 of FIG. 3) may be received at the CAN-AVB gateway interface 402 from the CAN high bus/input line 404. Although illustrated as being connected to only the CAN network, it is to be understood that the CAN-AVB gateway interface 402 may be connected to the CAN network, the AVB network, and/or one or more other AVB and/or non-AVB networks. The data may be stored in receive buffers 406 of Ethernet controller interface 408 for bit synching purposes, then passed to the combined CAN stack/Ethernet AVB stack 410 for processing. The combined stack 410 may enable both CAN features and Ethernet AVB features to be implemented by the Ethernet AVB-CAN interface host controller module 400. For example, the CAN functionality and/or CAN-to-AVB message conversion may be provided by processing blocks such as the CAN start/stop control block, the CAN fault handler block, the CAN framer block, and/or other suitable CAN blocks. AVB features may be provided by processing blocks such as the 802.1Qas block, the 802.1Qav block, the 1722/AVTP block, and/or other suitable AVB blocks. The combined stack 410 may output interrupt signals and/or data to one or more devices external to the AVB-CAN host controller module (e.g., devices connected via a data bus such as vehicle systems, other devices in the infotainment system, etc.).

One or more processing blocks of the combined stack 410 and/or other elements in the AVB-CAN interface host controller module 400 may be governed by a clock 412. Clock 412 may be a local clock that receives timer/clock input data from one or more master clock devices in order to synchronize the clock (and the AVB-CAN interface host controller module 400) with the master clock(s). The one or more processing blocks of combined stack 410 and/or other elements of the AVB-CAN host controller 400 may additionally or alternatively be user-configurable. For example, features such as bit rate, number of samples per bit, bit timing parameters, synchronization mechanism selection, system programmable interrupts, data and baud rates, and/or other features may be adjusted based on user input and/or automatically adjusted based on a state of the system and/or one or more devices in the system.

The combined stack 410 may receive data from a data bus (e.g., from the devices connected to the data bus, such as vehicle systems, other devices in the infotainment system, etc.), process the received data according to one or more CAN and/or AVB processing blocks, and pass the processed data to transmit buffers 414 of the Ethernet controller interface 408. Transmit buffers 414 may temporarily hold the data for transmission to the CAN bus (e.g., CAN low bus/input line 416) and/or devices connected thereto via the CAN-AVB gateway interface 402. The receive buffers 406 and transmit buffers 414 may support multiple priority based protocols. For example, the buffers may be able to operate according to different parameters for different types of data traffic (e.g., traffic having different levels of priority) and/or the buffers may be user configurable. In this way, the system may support a flexible buffering scheme.

Figure 5:
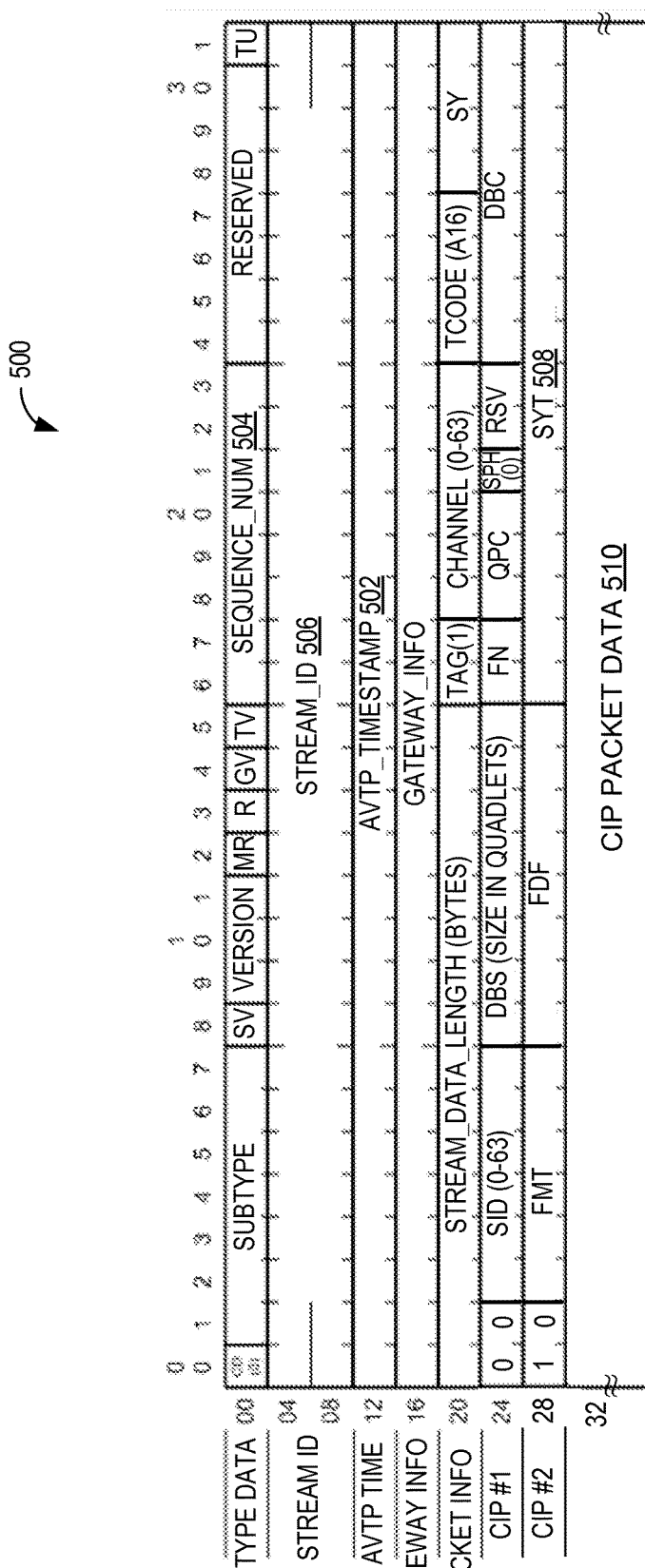
FIG. 5 shows an example packet structure in accordance with one or more embodiments of the present disclosure.

FIG. 5 illustrates an example packet 500 including a timestamp_valid field (e.g., "TV" field 502) and a presentation time (e.g., AVTP_TIMESTAMP field 504). Other fields of note may include the SEQUENCE_NUM field 506, which may indicate a place of the packet in the audio/video stream (e.g., how many packets were sent before that packet in the current audio/video stream). STREAM_ID field 508 may indicate an identifier for the stream, which designates the stream to which the packet belongs. As described above, AVTP_TIMESTAMP field 504 indicates a time at which the packet is to be played back (e.g., a real time and/or a time that is reachable by a media clock of a listener). SYT field 510 may indicate a SYT_INTERVAL, which denotes the number of data blocks between two successive valid AVTP_TIMESTAMP fields. CIP PACKET DATA field 512 may include the payload of the packet (e.g., while each of the other fields illustrated in FIG. 5 and/or described above make up the header of the packet). For example, CIP PACKET DATA field 512 may include the audio/video data blocks/samples to be played back at the time indicated in the AVTP_TIMESTAMP field 504.

In order to provide interoperability between AVB and CAN network messages, CAN message elements may be mapped to fields in typical Ethernet AVB packets to keep fixed format messages with a set size/range of sizes, message identifiers, and support for dynamically adding nodes and including CAN frame types such as Data, Remote, Error, and Overload frames. For example, the payload of the AVB packets transmitted to/from the AVB-CAN host controller may accommodate a new Ethertype for CAN and may include one or more of a start of frame, an arbitration field, a control field, a data field, and a CRC field.

Figure 6:
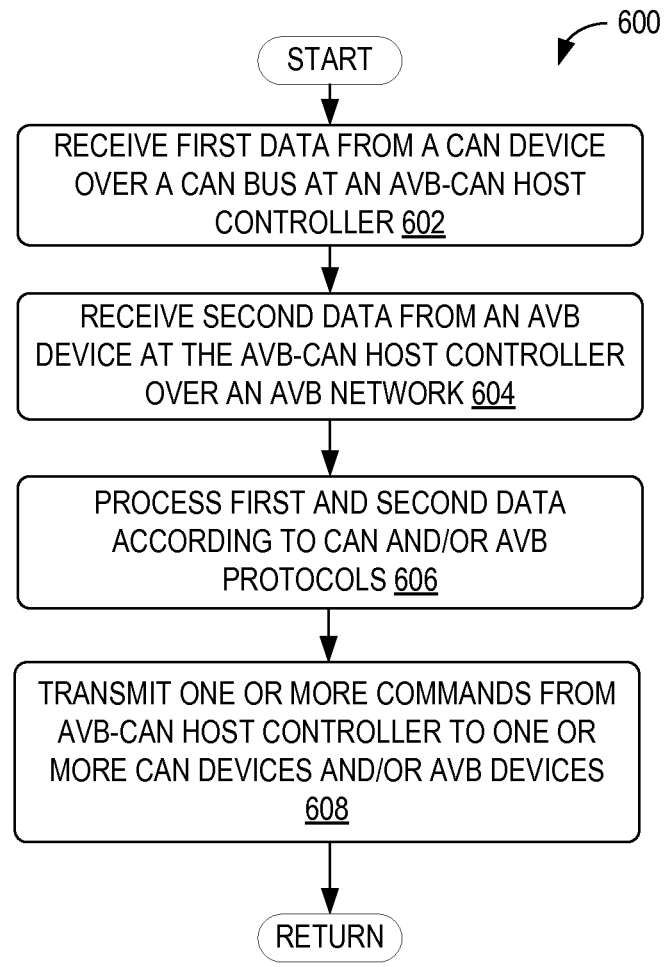
FIG. 6 is a flow chart for an example method of interfacing a CAN network and an AVB network with an AVB-CAN host controller in accordance with one or more embodiments of the present disclosure.

FIG. 6 is a flow chart of a method 600 for receiving CAN and AVB data at an Ethernet AVB-CAN controller. For example, method 600 may be performed at Ethernet AVB-CAN interface host controller module 400 of FIG. 4. At 602, method 600 includes receiving first data (e.g., a first stream, packet, and/or other instance of data) from a CAN device over a CAN bus at an AVB-CAN host controller. For example, the first data may be received by an interface such as CAN-AVB gateway interface 402 of FIG. 4. The first data may be received at the CAN-AVB gateway interface without being received at a CAN controller (e.g., a CAN controller may be omitted from the system in which method 600 is performed) and/or any other controller/interface device. In other words, the first data may be sent from a first, CAN device (e.g., a vehicle system connected to a CAN bus) directly to the AVB-CAN host controller. At 604, the method includes receiving second data (e.g., a second stream, packet, and/or other instance of data) from an AVB device at the AVB-CAN host controller over an AVB network. For example, the AVB device may be connected to the AVB-CAN host controller via an Ethernet connection (e.g., via an Ethernet AVB network) and may transmit the second data to the AVB-CAN host controller directly over the network (e.g., without passing through an intermediate device that is outside of the AVB network).

At 606, the method includes processing the first and second data according to CAN and/or AVB protocols. For example, the combined stack 410 of FIG. 4 may receive the first and second data and process the data accordingly. Example of data processing that may be performed at 606 are described below with respect to FIG. 7. At 608, the method includes transmitting one or more commands from the AVB-CAN host controller to one or more CAN devices and/or AVB devices. For example, based on the data received from one or more CAN devices (e.g., sensor data from a vehicle sensor indicating a status and/or operating conditions of the vehicle), commands to alter behavior of one or more AVB devices (e.g., update a display of a head unit of an infotainment system/in-vehicle computing system) may be transmitted to the one or more AVB devices. In another example, in response to data received from one or more AVB devices (e.g., user input to an in-vehicle computing system requesting a change in cabin temperature), commands to alter behavior of one or more CAN devices (e.g., instructions to a climate control system of the vehicle to adjust operation based on the user input) may be transmitted to the one or more CAN devices. In additional or alternative examples, commands may be transmitted to one or more CAN devices based on data received from one or more CAN devices and/or commands may be transmitted to AVB devices based on data received from one or more AVB devices.

Figure 7:
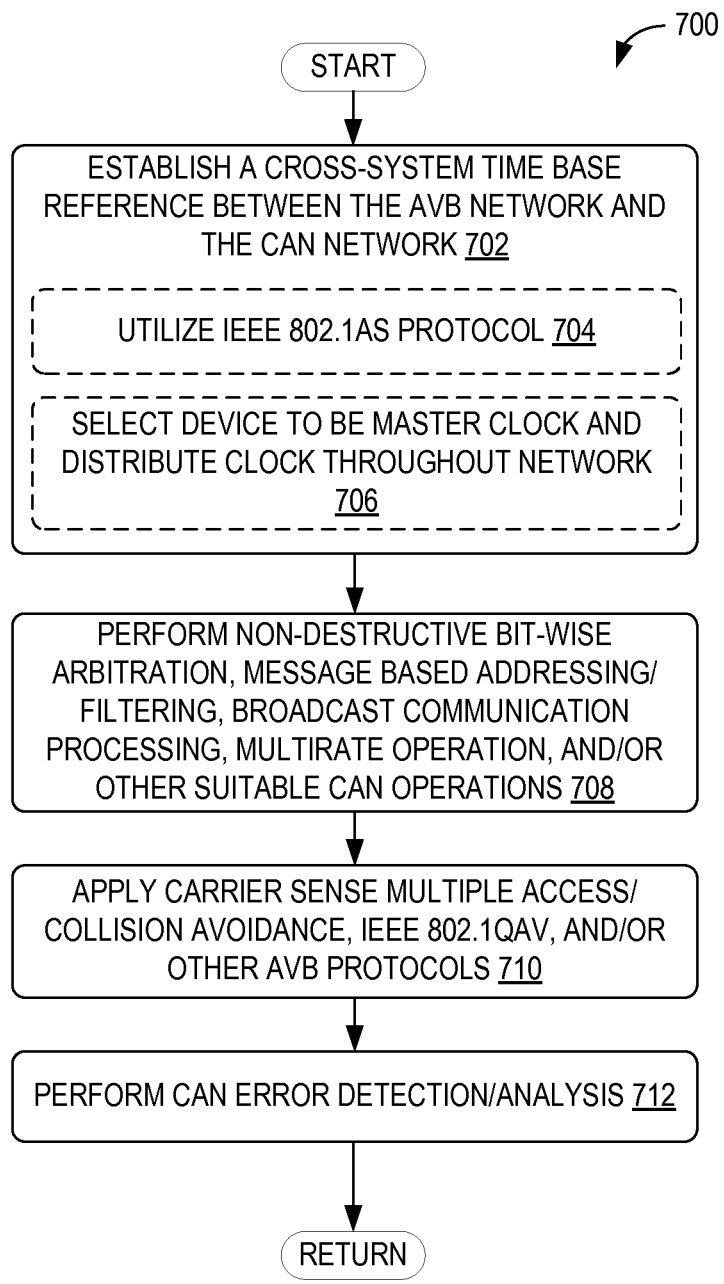
FIG. 7 is a flow chart for an example method of processing incoming/outgoing CAN and AVB data in accordance with one or more embodiments of the present disclosure.

FIG. 7 is a flow chart of a method 700 of processing incoming/outgoing CAN/AVB data for CAN/AVB devices. For example, one or more elements discussed below with respect to method 700 may be performed by an AVB-CAN host controller (e.g., 400 of FIG. 4) at 606 and/or prior to 608 (e.g., to generate the transmitted commands) of FIG. 6. At 702, method 700 includes establishing a cross-system time base reference between the AVB devices of the AVB network and the CAN devices of the CAN network. For example, IEEE 802.1as protocol ("Timing and Synchronization for Time-Sensitive Applications in Bridged Local Area Networks") may be utilized for establishing the cross-system time base reference, as indicated at 704. The time base reference may be established by selecting a device to be a master clock and distributing that clock throughout each network, as indicated at 706. In this way, each device in the CAN and AVB networks, including the AVB-CAN host controller, may be synchronized to the same master clock. Further, propagation latency on each bus connected to the controller (e.g., including one or more CAN busses) may be determined.

At 708, the method includes performing CAN operations on data received/transmitted to CAN/AVB devices, the operations including but not limited to performing non-destructive bit-wise arbitration, message-based addressing/filtering, broadcast communication processing, multi-rate operation, and/or other suitable CAN operations. The controller may also support other CAN protocols, such as multi-masters that enable the controller to go to slave mode for one or more CAN nodes to which the controller is connected (e.g., allowing the CAN nodes to perform one or more CAN operations, such as error handling and the transfer of frames between nodes of the network without host controller instructions). In this way, despite the lack of a dedicated CAN controller, the AVB-CAN host controller may be utilized to simulate the CAN controller using a processor stack (e.g., combined stack 410 of FIG. 4). As indicated at 710, AVB operations including but not limited to carrier sense multiple access/collision avoidance, IEEE 802.1Qav (e.g., for reserving bandwidth for time critical messages), and/or other AVB protocols may be applied to transmitted/received data. For example, the electronic devices (e.g., both CAN and AVB devices) that communicate data in the above-described examples may first establish a reservation for the data communication. Upon startup, the devices may attain a link status, which enables the devices to communicate with peer nodes or devices in the system. After link status is attained, the devices may be initialized with a reservation protocol. For Audio-Video Bridging networks, the reservation protocol may be Stream Reservation Protocol (SRP). The initialization process may include a domain negotiation in which domain packets may be communicated with peer nodes. After the initialization process is performed, the devices may establish a reservation for the data stream communication. The reservation may be a reservation for a network path through the network and/or for network resources such as bandwidth, which may be guaranteed during communication of the data stream. Where a reservation protocol is used, messages may be communicated between the talkers and the listeners in accordance with the reservation protocol to establish the reservation. Once the reservation is established, the data stream may be communicated over the network.

As indicated at 712, the method may include performing error detection/analysis according to CAN protocols, including but not limited to error diagnosis and/or extended CRC checksum insertion/analysis. Currently, there are no error detection mechanisms in legacy Ethernet and the CAN based implementation over Ethernet will ensure error detection mechanisms are present for validating that there are no errors in data received from CAN and/or AVB networks. Sequence numbers in packet data (e.g., in headers of packets) may be used for detecting errors and duplicate packets, while the timestamp of Ethernet AVB packets may be used for managing protocols when packets are received at different point of time. Packets that are determined to be lost, include errors, and/or be incomplete may be retransmitted according to CAN protocols. For transmitted data, the system may additionally or alternatively preempt and/or abort a transmission attempt based on error analysis.

Ethernet AVB based implementation of CAN based protocols as described herein may help to solve issues like handling priority enqueing in software layers, handling error detection/analysis, handling security considerations (e.g., by using an access control system which only allows authorized users to access the system), and otherwise adding CAN functionality to the AVB network. The systems described above may support AVB networks and any suitable time-sensitive (non-AVB) networks, including but not limited to CAN networks configured according to CAN 2.0A, 2.0B, and/or Bosch CAN DF Flexible Data-Rate specifications. An Ethernet AVB-CAN host controller that includes a CAN-AVB gateway to interface signals between both AVB and CAN physical layers as described allows a dedicated CAN controller to be removed from the system, reducing overall cost, complexity, and size of the system compared to hybrid CAN/AVB systems while increasing functionality compared with other AVB-only systems.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the Ethernet AVB-CAN interface host controller module 400 described with reference to FIG. 4. The methods may be performed by executing stored instructions with one or more logic devices (e.g., processors) in combination with one or more additional hardware elements, such as storage devices, buffers, memory, hardware network interfaces/antennas, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A device comprising:
    a gateway interface communicatively connectable to one or more devices and configured to transmit and receive data from an audio-video bridging (AVB) network and at least one other network, the at least one other network being a non-AVB network;
    a processor; and
    a storage device that stores instructions executable by the processor to:
        receive, via the gateway interface, first data from a first device in the at least one other, non-AVB, network;
        receive, via the gateway interface, second data from a second device in the AVB network;
        process the first data from the at least one other, non-AVB, network with a combined stack according to an AVB protocol, the combined stack including one or more non-AVB processing blocks and one or more AVB processing blocks; and
        transmit one or more commands to one or more of the first device and the second device.

2. The device of claim 1, wherein at least one other network comprises a Controller Area Network (CAN) of a vehicle, the first device is a CAN device, and the second device is an AVB device.

3. The device of claim 2, wherein processing the first data according to the AVB protocol comprises processing the first data received from the CAN device according to the one or more AVB processing blocks of the combined stack.

4. The device of claim 1, wherein the AVB protocol comprises a time synchronization protocol according to IEEE 802.1as.

5. The device of claim 1, wherein the AVB protocol comprises a traffic shaping protocol according to IEEE802.1Qav.

6. The device of claim 1, wherein the AVB protocol comprises a carrier sense multiple access/collision avoidance protocol.

7. The device of claim 2, wherein the instructions are further executable to process the second data received from the AVB device with the combined stack according to a CAN protocol, the one or more non-AVB processing blocks including one or more CAN processing blocks.

8. The device of claim 7, wherein the CAN protocol comprises one or more of non-destructive bit-wise arbitration, message-based addressing/filtering, broadcast communication processing, and multi-rate operation.

9. The device of claim 7, wherein the CAN protocol includes one or more of error detection and analysis.

10. A communication system comprising:
    an AVB device included in an Ethernet AVB network;
    a Controller Area Network (CAN) device included in a CAN network; and
    an Ethernet AVB-CAN interface host controller included in the Ethernet AVB network and communicatively connected to the AVB device and the CAN device, the controller including a CAN-AVB gateway interface configured to communicate data via a CAN bus, and a combined processor stack including one or more AVB processing blocks and one or more CAN processing blocks, the combined processor stack configured to execute instructions stored on a storage device of the controller to:
        process received data with the combined processor stack according to one or more of an AVB protocol and a CAN protocol, where received data from the AVB device is processed according to the CAN protocol using at least one of the one or more CAN processing blocks, and
        transmit a command to one or more of the AVB device and the CAN device based on the received data.

11. The system of claim 10, wherein processing received data according to one or more of an AVB protocol and a CAN protocol comprises processing data received from the CAN device according to the AVB protocol.

12. The system of claim 11, wherein the AVB protocol comprises one or more of a time synchronization protocol according to IEEE 802.1as and a traffic shaping protocol according to IEEE802.1Qav.

13. The system of claim 11, wherein the AVB protocol comprises a carrier sense multiple access/collision avoidance protocol.

14. The system of claim 10, wherein processing received data according to one or more of an AVB protocol and a CAN protocol comprises establishing a reservation for the received data according to one or more AVB protocols and then performing error detection and analysis on the received data according to at least one of the one or more CAN processing blocks.

15. The system of claim 10, wherein the CAN protocol comprises one or more of non-destructive bit-wise arbitration, message-based addressing/filtering, broadcast communication processing, and multi-rate operation.

16. The system of claim 10, wherein the CAN protocol includes one or more of error diagnosis and CRC checksum insertion and analysis.

17. The system of claim 10, wherein the AVB device comprises an in-vehicle computing system of a vehicle and the CAN device comprises a vehicle system communicatively connected to a CAN bus of the vehicle, and wherein data is communicated directly from the CAN device to the Ethernet AVB-CAN interface host controller without traversing a CAN controller.

18. A method for interfacing an AVB network and a non-AVB network with a host controller, the method comprising:
    receiving first data from a first device in the non-AVB network;
    receiving second data from a second device in the AVB network;
    processing, with a combined stack including one or more AVB processing blocks and one or more non-AVB processing blocks, the first data according to an AVB protocol with at least one of the one or more AVB processing blocks, and processing the second data according to a protocol associated with the non-AVB network with at least one of the one or more non-AVB processing blocks; and transmitting one or more commands to one or more of the first device and the second device.

19. The method of claim 18, wherein the non-AVB network is a Controller Area Network (CAN) of a vehicle and wherein the one or more non-AVB processing blocks include one or more CAN processing blocks.

* * * * *